US012765983B2

(12) United States Patent
Ye

(10) Patent No.: US 12,765,983 B2
(45) Date of Patent: Oct. 20, 2026

(54) SHAFT SEALING ASSEMBLY OF HANDHELD DEVICE, FRONT END WATERPROOF ASSEMBLY, AND HOST DEVICE

(71) Applicant: Shenzhen Shuye Technology Co., Ltd., Shenzhen (CN)

(72) Inventor: Hongxin Ye, Zhejiang Province (CN)

(73) Assignee: Shenzhen Shuye Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/764,289

(22) Filed: Jul. 4, 2024

(65) Prior Publication Data

US 2025/0186182 A1 Jun. 12, 2025

(30) Foreign Application Priority Data

Dec. 11, 2023 (CN) ........................ 202311700539.3

(51) Int. Cl.

| | |
|---|---|
| ***A61C 17/22*** | (2006.01) |
| ***F16J 15/32*** | (2016.01) |
| ***F16J 15/3208*** | (2016.01) |
| ***F16J 15/3212*** | (2016.01) |
| ***F16J 15/34*** | (2006.01) |

(52) U.S. Cl.

CPC ......... *A61C 17/225* (2013.01); *F16J 15/3456* (2013.01); *F16J 15/32* (2013.01); *F16J 15/3208* (2013.01); *F16J 15/3212* (2013.01)

(58) Field of Classification Search

CPC ...... F16J 15/32; F16J 15/3208; F16J 15/3212; F16J 15/3456; A61C 17/225

See application file for complete search history.

(56) References Cited

U.S. PATENT DOCUMENTS 2,561,694 A * 7/1951 Gilbert, Sr. .......... F16J 15/3456 277/366
3,442,516 A * 5/1969 Voitik .................. F16J 15/3456 277/369

(Continued)

FOREIGN PATENT DOCUMENTS

| | | |
|---|---|---|
| AT | 171596 B | 6/1952 |
| CN | 106286841 A | 1/2017 |

(Continued)

OTHER PUBLICATIONS

International search report of PCT/CN2024/073651.
International search report of PCT/CN2024/086805.

*Primary Examiner* — Nicholas L Foster

(57) ABSTRACT

A shaft sealing assembly of a handheld device includes: a center shaft; and a movable sealing assembly, including a fixation seat and a movable sealing member. The fixation seat defines a sleeving hole, an inner circumferential surface of the sleeving hole defines an annular sealing slot, the sealing slot has a front wall surface and a rear wall surface opposite to the front wall surface in an axial direction. The movable sealing member is made of flexible material, the movable sealing member is received in the sleeving hole and extends into the sealing slot, the movable sealing member defines a fixation shaft hole which is sealed to and fixedly sleeves the center shaft, the movable sealing member is sealed to and rotatably mated to the front wall surface and the rear wall surface.

3 Claims, 9 Drawing Sheets

(56) References Cited

U.S. PATENT DOCUMENTS

| | | | | |
|---|---|---|---|---|
| 3,511,511 | A * | 5/1970 | Voitik .................. | F16J 15/3456<br>277/366 |
| 3,988,026 | A * | 10/1976 | Kemp, Jr. ............ | F16J 15/3472<br>277/374 |
| 4,348,031 | A * | 9/1982 | Johnston ................ | F16J 15/164<br>277/377 |
| 4,595,206 | A * | 6/1986 | Holzer ................. | F16J 15/3232<br>277/366 |
| 5,603,637 | A | 2/1997 | Matsuoka et al. | |
| 8,641,417 | B2 * | 2/2014 | Kumar ................... | A61C 1/057<br>433/125 |
| 2010/0102517 | A1 * | 4/2010 | Kumar ................... | A61C 1/057<br>277/553 |
| 2017/0119511 | A1 | 5/2017 | Sablatschan et al. | |

FOREIGN PATENT DOCUMENTS

| | | | | |
|---|---|---|---|---|
| CN | 110037820 | A * | 7/2019 | ........... F16J 15/3268 |
| CN | 209332343 | U | 9/2019 | |
| CN | 111606537 | A | 9/2020 | |
| CN | 211485028 | U | 9/2020 | |
| CN | 211834830 | U | 11/2020 | |
| CN | 211884116 | U | 11/2020 | |
| CN | 215521973 | U | 1/2022 | |
| CN | 215651705 | U | 1/2022 | |
| CN | 217696937 | U | 11/2022 | |
| CN | 218920132 | U | 4/2023 | |
| CN | 219332045 | U | 7/2023 | |
| CN | 221569414 | U | 8/2024 | |
| GB | 2022728 | A | 12/1979 | |
| JP | S57145412 | A | 9/1982 | |
| WO | 2025044221 | A1 | 3/2025 | |

* cited by examiner

SHAFT SEALING ASSEMBLY OF HANDHELD DEVICE, FRONT END WATERPROOF ASSEMBLY, AND HOST DEVICE

CROSS REFERENCE TO RELATED APPLICATIONS

The present claims the priority of the Chinese patent application No. 202311700539.3, filed on Dec. 11, 2023, contents of which are incorporated herein by its entireties.

TECHNICAL FIELD

The present disclosure relates to the field of waterproof of handheld devices, and in particular to a shaft sealing assembly of a handheld device, a front end waterproof assembly, and a host device.

BACKGROUND

A handheld device has a small size, and therefore, it is technically difficult to achieve waterproof for a motion member of the handheld device. An electric toothbrush is a typical handheld device, movement of a center shaft of the electric toothbrush constantly wears a waterproof sealing member, ultimately resulting failure in the sealing member and water leakage. Once the sealing member fails, external stains, such as toothpaste foam, may fill a gap at a circumferential surface of the center shaft and enter an internal cavity of a handle, such that the handheld device may be malfunctioned.

For the electric toothbrush in the past, a brush head rotates forwardly and reversely to a small extent to achieve vibration. Alternatively, a magnetic levitation motor is arranged to drive the brush head to vibrate. In this way, a motion amplitude of the brush head is small, and therefore, the sealing member may be less worn.

For the electric toothbrush in the art, an operation head is driven to rotate at a larger rotational stroke and to switch between forward rotation and reverse rotation at a higher frequency. For example, the electric toothbrush needs to drive the brush head to move at a larger amplitude to enhance a tooth-brushing effect or to drive the brush head to rotate for 360 degrees to clean the tongue. However, technical requirements of the above development cannot be met based on the technical solutions in the art, resulting in the center shaft having a short waterproof service life and the product having a high after-market maintenance rate.

SUMMARY OF THE DISCLOSURE

The present disclosure provides a front end waterproof assembly of a handheld device, and a host device of the handheld device, aiming to solve the technical problem that the center shaft sealing member of the handheld device has a short waterproof service life, the center shaft is inadapted to rotating at a larger rotational stroke and switching between forward rotation and reverse rotation at a higher frequency.

In a first aspect, the present disclosure provides a shaft sealing assembly of a handheld device, including:

a center shaft; and a movable sealing assembly, comprising a fixation seat and a movable sealing member.

The fixation seat defines a sleeving hole, an inner circumferential surface of the sleeving hole defines an annular sealing slot, the sealing slot has a front wall surface and a rear wall surface opposite to the front wall surface in an axial direction.

The movable sealing member is made of flexible material, the movable sealing member is received in the sleeving hole and extends into the sealing slot, the movable sealing member defines a fixation shaft hole which is sealed to and fixedly sleeves the center shaft, the movable sealing member is sealed to and rotatably mated to the front wall surface and the rear wall surface.

In some embodiments, a gap is defined between an outer circumferential surface of the movable sealing member and the inner circumferential surface of the sealing slot, the movable sealing member and the fixation seat cooperatively enclose a sealing compartment located in an inner cavity of the sealing slot.

In some embodiments, the movable sealing assembly further comprises an oily sealing material filled in the sealing compartment, the oily sealing material forms an oil sealing interface between the movable sealing member and the front wall surface and an oil sealing interface between the movable sealing member and the rear wall surface.

In some embodiments, a front end face of the movable sealing member is arranged with a front annular projection at a periphery of the fixation shaft hole, the front annular projection is sealed to and rotatably mated with the front wall surface; a rear end face of the movable sealing member is arranged with a rear annular projection at another periphery of the fixation shaft hole, the rear annular projection is sealed to and rotatably mated with the rear wall surface.

In some embodiments, each of the front wall surface and the rear wall surface is a highly smooth surface, a friction coefficient of each of the front wall surface and the rear wall surface is less than a friction coefficient of an outer surface of the fixation seat.

In some embodiments, the movable sealing member is axially pre-compressed to the front wall surface and the rear wall surface.

In some embodiments, the movable sealing assembly further comprises an annular clamp, the annular clamp sleeves an outer circumferential surface of the movable sealing member, the annular clamp and the movable sealing member fit tightly to each other in a radial direction.

In some embodiments, the outer circumferential surface of the movable sealing member defines an annular limiting slot, the annular clamp is received in the annular limiting slot.

In some embodiments, the annular clamp is a coiled spring, a front end and a rear end of the annular clamp respectively resiliently abut against two walls of the limit slot that face opposite to each other in the axial direction.

In some embodiments, the fixation seat comprises a base and a front cover fixedly connected to the base, the base and the front cover cooperatively enclose the sleeving slot and the sealing slot, the sleeving slot comprises a rear opening defined in the base and a front opening defined in the front cover, the front wall surface of the sealing slot is formed on the front cover, and the rear wall surface of the sealing slot is formed on the base.

In some embodiments, an interference amount between the movable sealing member and the fixation seat, in the axial direction, is in a range of [0.1%, 0.5%].

In some embodiments, the base comprises a sealing cylinder, an inner periphery of the sealing slot is formed on the sealing cylinder, an inner wall surface of a front end of the sealing cylinder defines an annular slot; the front cover comprises a cover plate and an inner stopping port, the cover plate covers an opening at a front side of the sealing cylinder, the inner stopping port is annular and protrudes from a rear side of cover plate, the inner stopping port is mated to be embedded in the annular slot.

In some embodiments, the movable sealing member is made of rubber or silicone, the base and the front cover are both made of plastic, a rear end surface of the inner stopping port is ultrasonically welded to an inner wall surface of the annular slot.

In some embodiments, an outer circumferential surface of the inner stopping port is arranged with an outer limiting plane, an inner circumferential surface of the annular slot is arranged with an inner limiting plane that is adapted and attached to the outer limiting plane.

In some embodiments, the base further comprises a positioning projection disposed on a front end face of the sealing cylinder, an outer edge of the front cover defines a positioning slot that is mated to the positioning projection.

In some embodiments, the positioning projection extends axially and protrudes from the outer circumferential surface of the sealing cylinder, an inner wall surface of a static sealing member defines an insertion slot which is mated to the positioning projection.

In a second aspect, the present disclosure provides a front end waterproof assembly configured for a handheld device, the front end waterproof assembly including:

- a housing, defining a cavity, wherein, a front end face of the housing defines a sealing hole communicated to the cavity;
- a static sealing member, received in and mated with the sealing hole, wherein the static sealing member defines a movable shaft hole communicated with the cavity; and the shaft sealing assembly as described in the above.

The center shaft extends through the movable shaft hole and extends out of the housing, the center shaft is sealed to and rotatably mated with the movable shaft hole.

The movable sealing assembly is received in the cavity and is disposed at a rear side of the static sealing member, the fixation seat is fixedly disposed relative to the housing.

In some embodiments, the static sealing member has an annular sealing surface that faces rearwardly, the annular sealing surface is formed at an outer periphery of the movable shaft hole; a front side of the fixation seat seals to and is attached to the annular sealing surface.

In some embodiments, the fixation seat and the static sealing member are tightly fitted to each other in the axial direction.

In some embodiments, an outer circumferential surface of the fixation seat is arranged with a positioning projection extending in the axial direction, an inner wall surface of the static sealing member defines an insertion slot mated to the positioning projection.

In a third aspect, the present disclosure provides a host device of a handheld device, the host device including a handle and a motor.

The host device of the handheld device further comprises the shaft sealing assembly for the handheld device as described in the above. The center shaft is a portion of a rotor of the motor, the fixation seat is fixedly disposed relative to the handle.

Alternatively, the host device of the handheld device further comprises the front end waterproof assembly for the handheld device as described in the above. The handle is the housing, the motor is disposed in the cavity of the housing, the center shaft is a portion of a rotor of the motor.

According to the present disclosure, the shaft sealing assembly of the handheld device forms two seals at the front wall surface and at the rear wall surface of the sealing slot by the movable sealing member and the fixation seat. The movable sealing member rotates with the center shaft. Therefore, there is no wear is generated between the movable sealing member and the center shaft. In addition, since a movable sealing interface is transferred to the movable sealing member, a sealing area is increased, and the sealing effect is improved. In this way, the waterproof service life of the shaft sealing assembly of the hand held device is extended, and the after-market maintenance rate of the product is reduced.

BRIEF DESCRIPTION OF THE DRAWINGS

In order to more clearly illustrate the technical solutions in the embodiments of the present disclosure, the accompanying drawings for describing the embodiments will be described in the following. Obviously, the accompanying drawings in the following are only some embodiments of the present disclosure, and any ordinary skilled person in the art may obtain other accompanying drawings according to these drawings without making any creative work.

DETAILED DESCRIPTION

Figure 1:
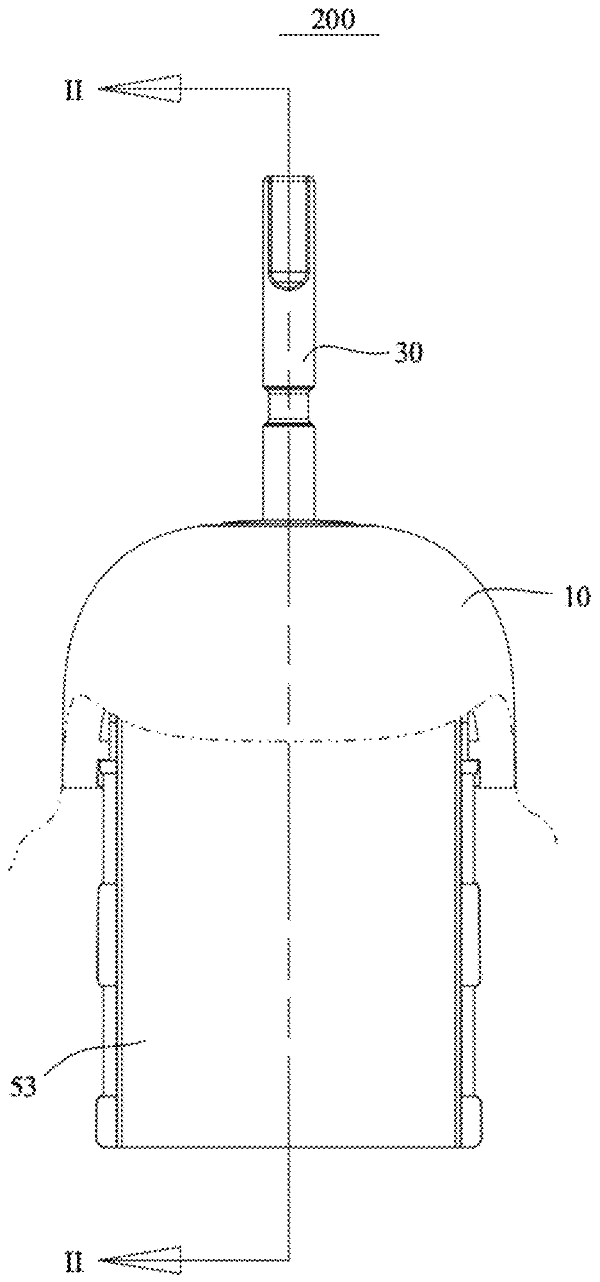
FIG. 1 is a front view of a portion of a front end waterproof assembly of a handheld device according to an embodiment of the present disclosure.
Figure 2:
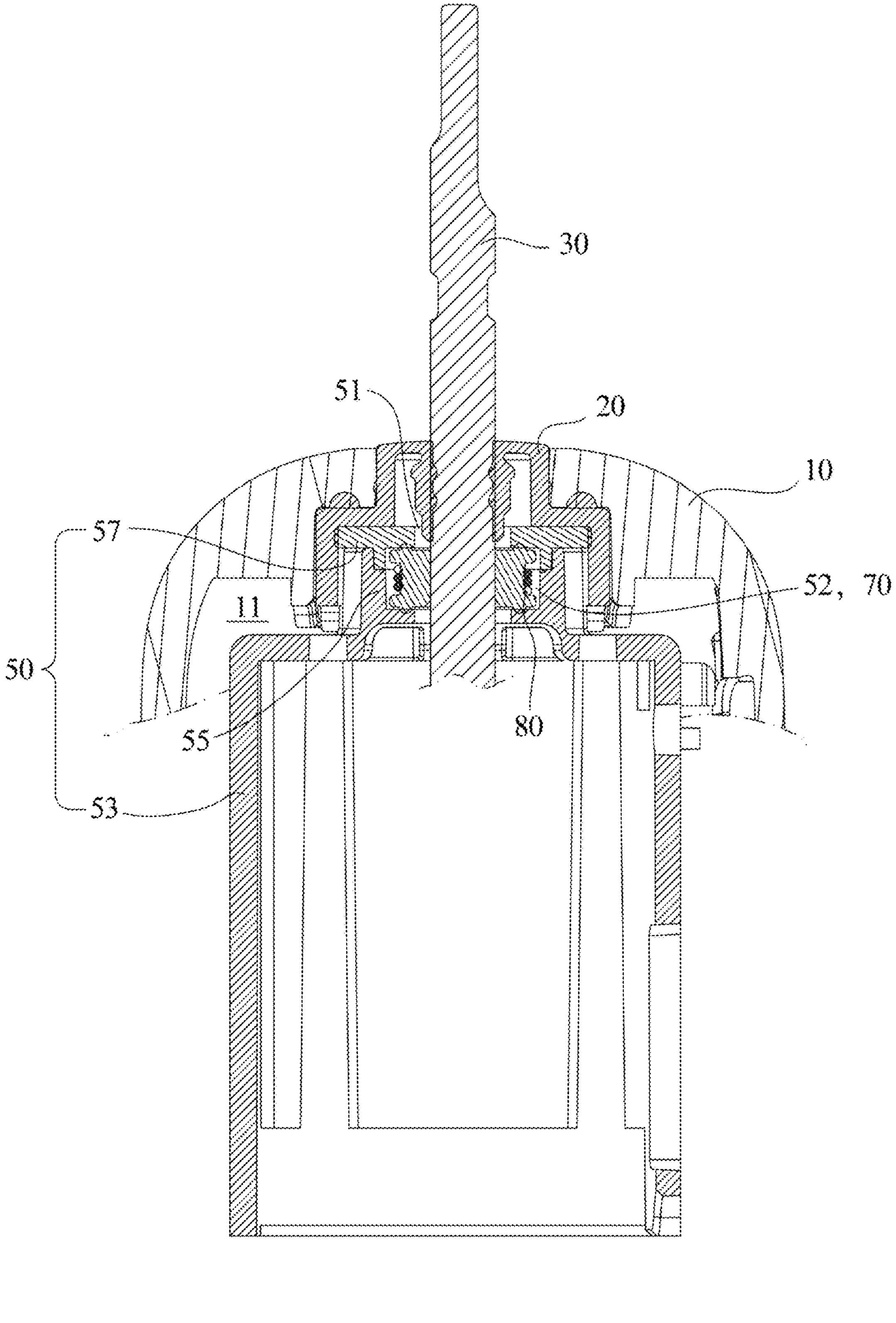
FIG. 2 is a cross-sectional view of the structure shown in FIG. 1, taken along a line II-II.
Figure 3:
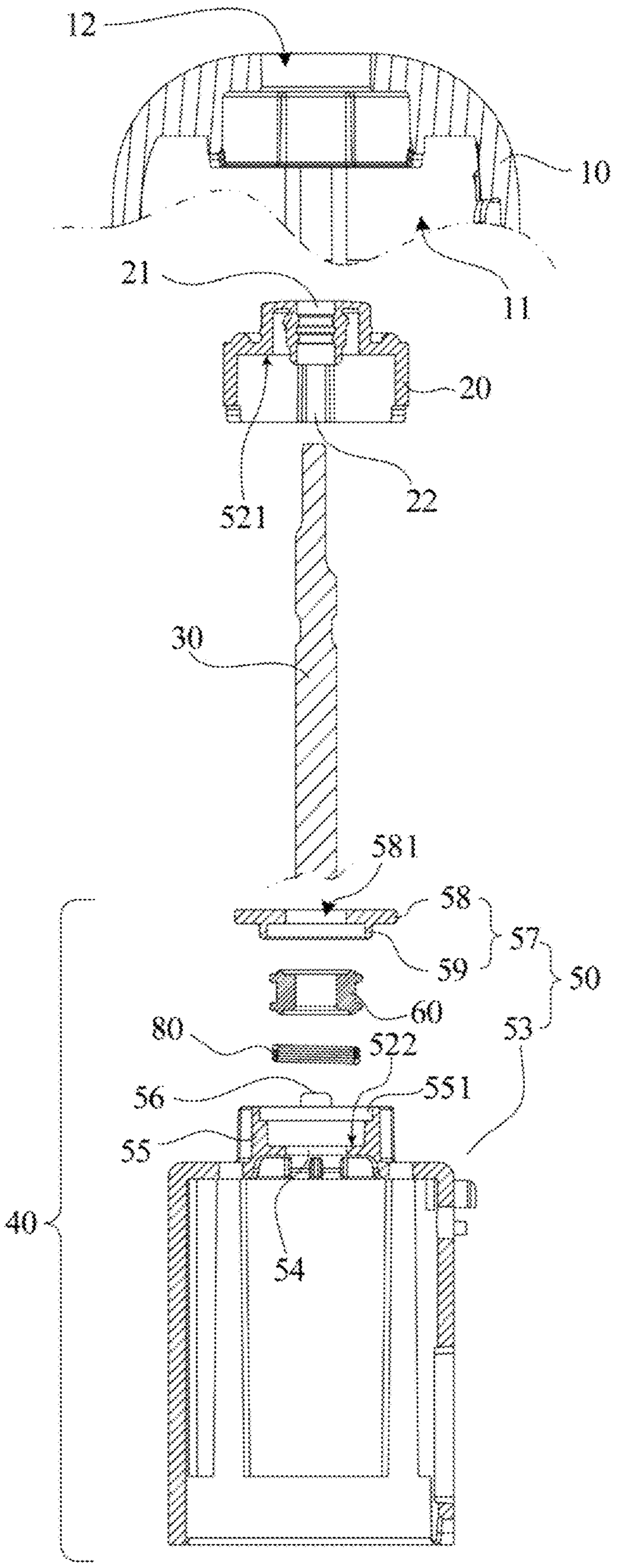
FIG. 3 is an exploded and cross-sectional view of the portion structure shown in FIG. 1, taken along a line II-II.
Figure 4:
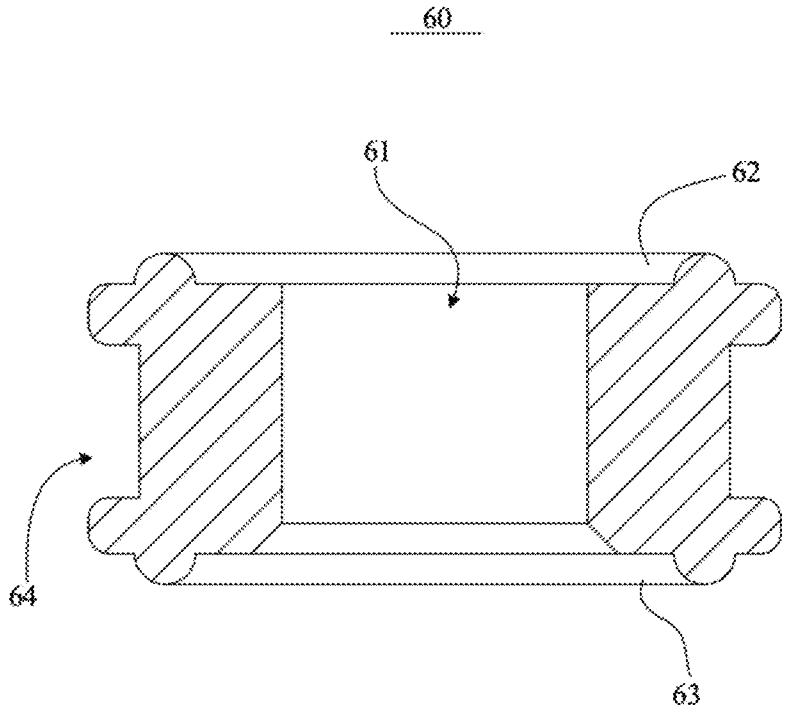
FIG. 4 is an enlarged view of a movable sealing member shown in FIG. 3.
Figure 5:
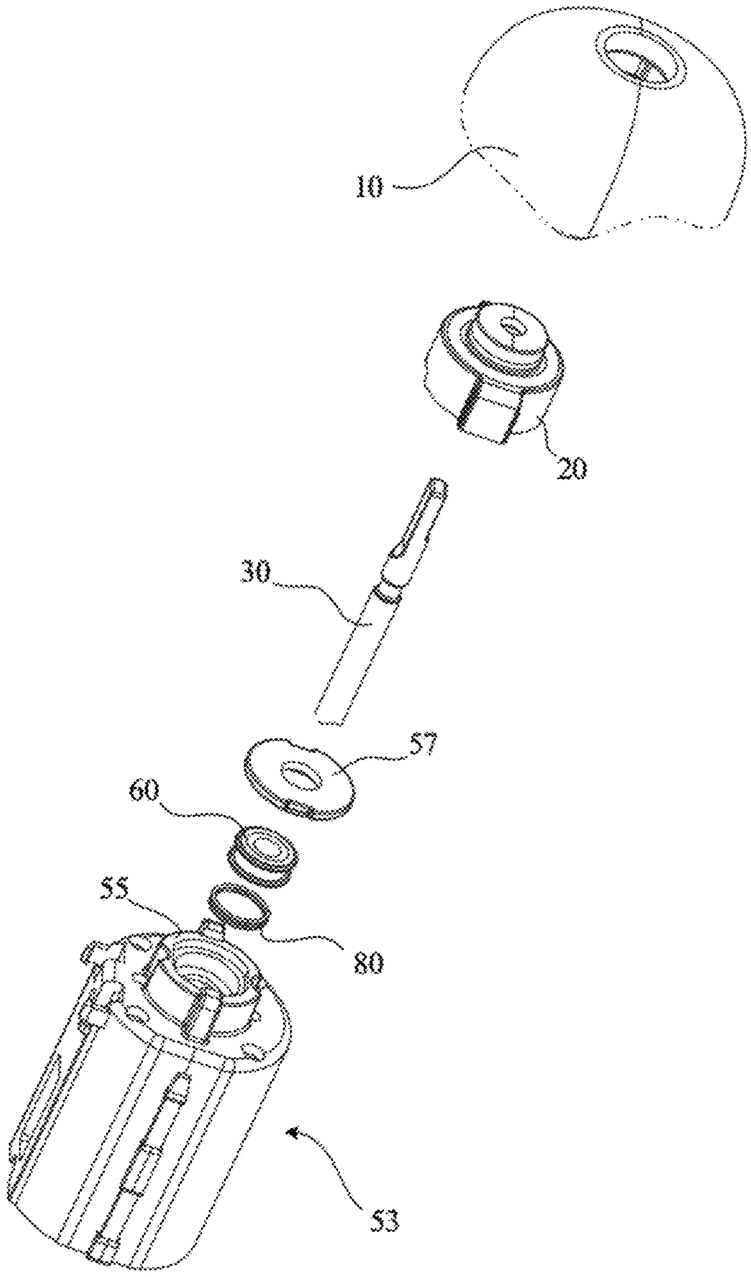
FIG. 5 is an exploded view of the portion structure shown in FIG. 1.
Figure 6:
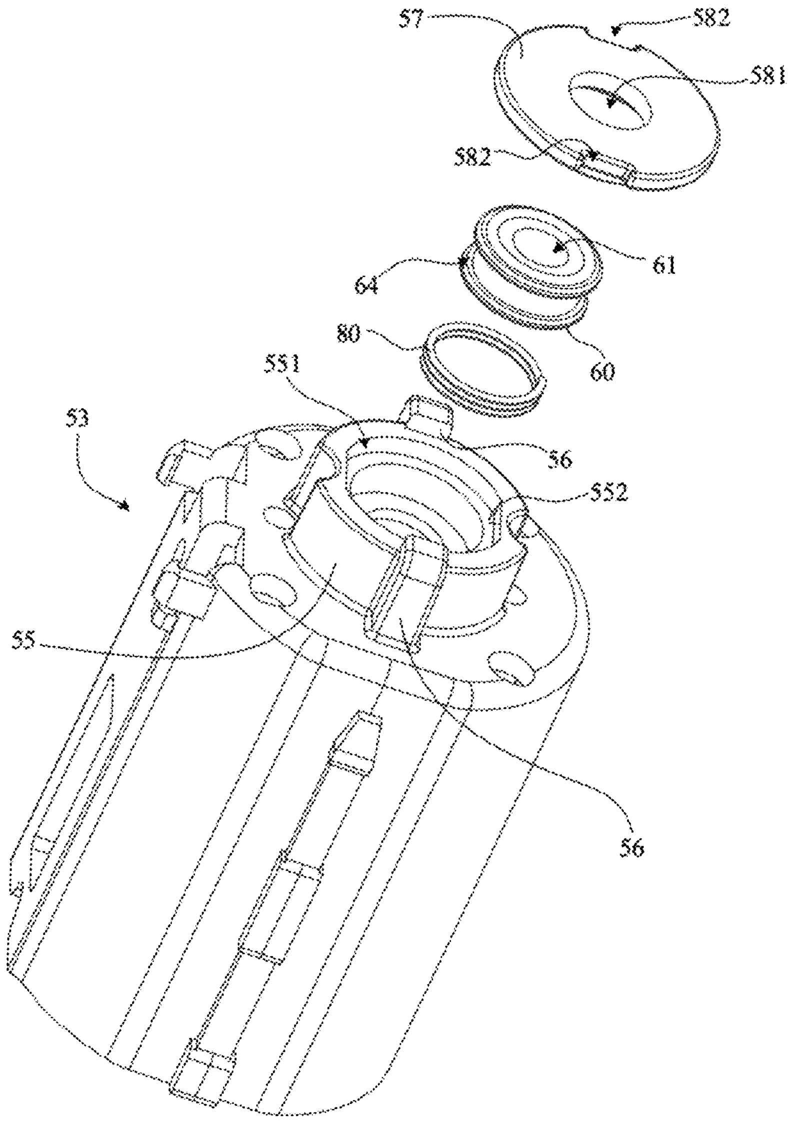
FIG. 6 is an enlarged view of the movable sealing member shown in FIG. 5.
Figure 7:
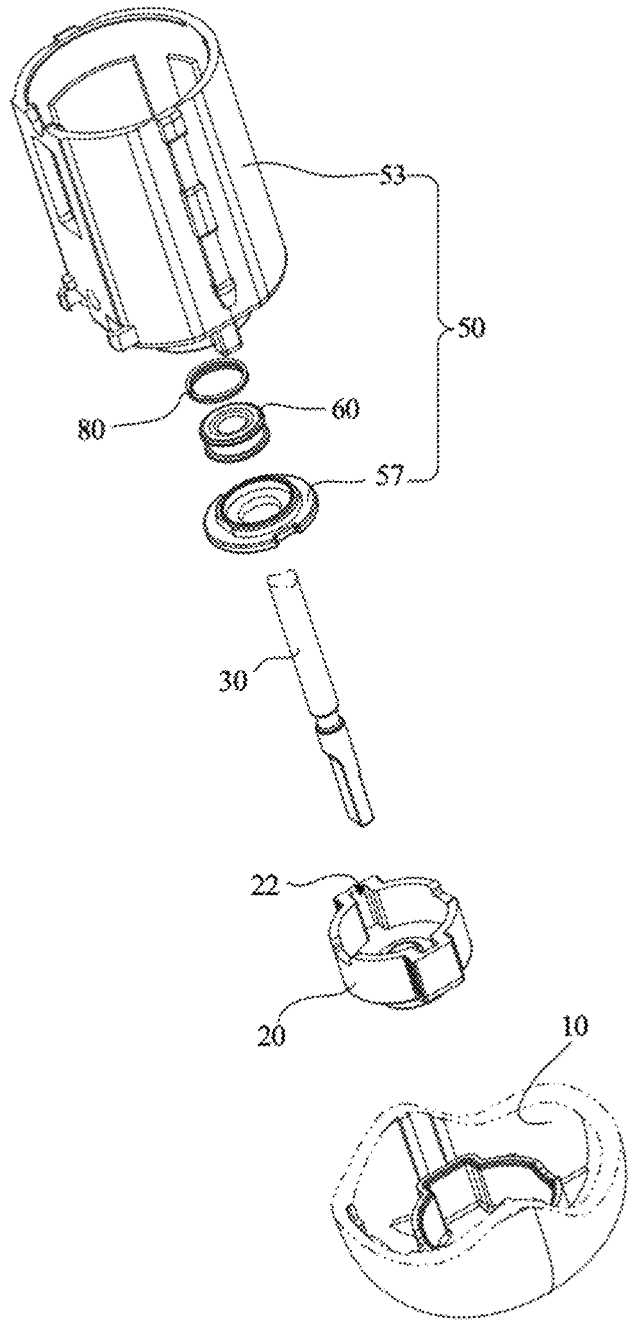
FIG. 7 is an exploded view of the portion structure shown in FIG. 1, being viewed from another viewing angle.
Figure 8:
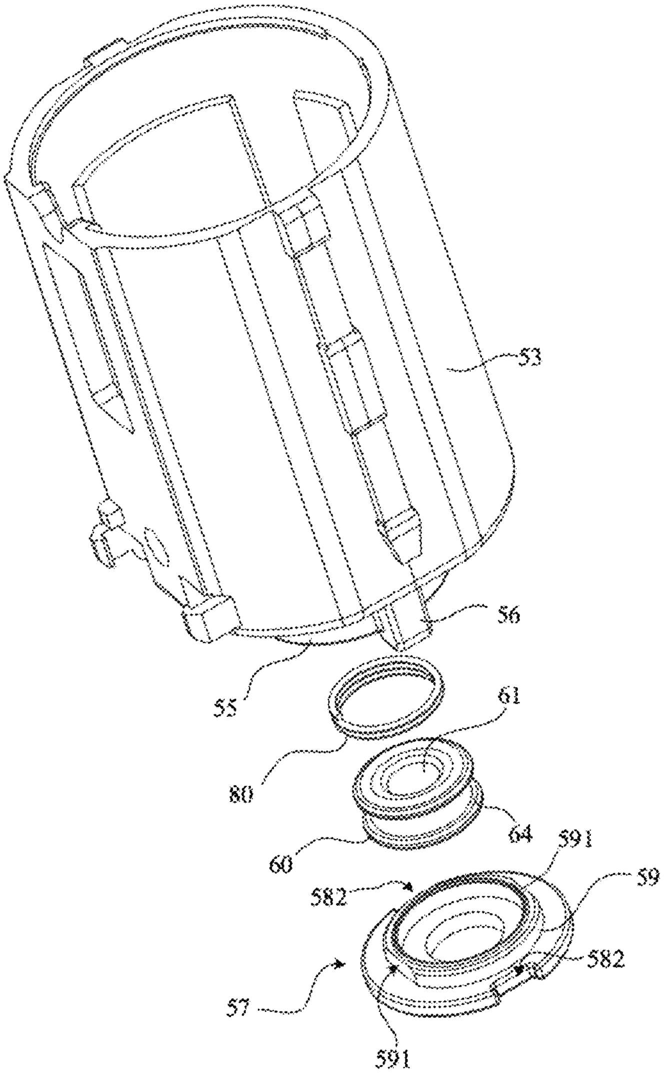
FIG. 8 is an enlarged view of the movable sealing assembly shown in FIG. 7.

Technical solutions in the embodiments of the present disclosure will be described clearly and completely in the following by referring to the accompanying drawings in the embodiments of the present disclosure. Obviously, the described embodiments are only some of, not all of, the embodiments of the present disclosure. All other embodiments, which are obtained by any ordinary skilled person in the art based on the embodiments of the present disclosure without making any creative work, shall fall within the scope of the present disclosure.

As shown in FIGS. 1 to 8, in an embodiment, a shaft sealing assembly of a handheld device is configured for a front end waterproof assembly 200 of the handheld device. The shaft sealing assembly of the handheld device includes the following.

A center shaft 30 is arranged.

A movable sealing assembly 40 is arranged and includes a fixation seat 50 and a movable sealing member 60.

The fixation seat 50 defines a sleeving hole 51, and an annular sealing slot is defined in an inner circumferential surface of the sleeving hole 51. The sealing slot 52 has a front wall surface 521 and a rear wall surface 522 opposite to the front wall surface 521, in an axial direction.

The movable sealing member 60 is made of flexible material. The movable sealing member 60 is received in the sleeving hole 51 and extends into the sealing slot 52. The movable sealing member 60 defines a fixation shaft hole 61 which is sealed to and fixedly sleeves the center shaft 30. The movable sealing member 60 is sealed to and rotatably mated to the front wall surface 521 and the rear wall surface 522.

In the present embodiment, the movable sealing member 60 is usually made of a flexible material, such as rubber, silicone, and so on.

The center shaft 30 is configured for connection and transmission. For example, in the embodiment of an electric toothbrush, a front end of the center shaft 30 is configured to arrange with a brush head, and a rear end of the center shaft 30 forms a portion of a rotor of a motor. It is understood that the center shaft 30 and the motor rotor may be configured as two separated elements, for example, a transmission mechanism may be arranged between the center shaft 30 and the motor rotor.

Since the fixation seat 50 is configured for supporting and limiting, the fixation seat 50 is usually made of a rigid material, such as hard rubber. A specific process of manufacturing the fixation seat 50 may be an injection molding process.

The sealing slot 52 and the movable sealing member 60 are fitted to each other to form a closed space to ensure a sealing effect. The movable sealing member 60 needs to be rotatably arranged with the front wall surface 521 and the rear wall surface 522 of the sealing slot 52.

For the front end waterproof assembly 200 of the handheld device of the present disclosure, two seals, at the front wall surface 521 and the rear wall surface 522 of the sealing slot 52, are formed by the movable sealing member 60 and the fixation seat 50, respectively. The movable sealing member 60 rotates as the center shaft 30 rotates, and therefore, there is no wear between the movable sealing member 60 and the center shaft 30. In addition, since a movable sealing interface is transferred to the movable sealing member 60, the sealing area is increased, and the sealing effect is improved, such that the waterproof service life of the shaft sealing assembly of the handheld device is extended, and an after-market maintenance rate of the device is reduced.

Further, a gap is defined between an outer circumferential surface of the movable sealing member 60 and an inner circumferential surface of the sealing slot 52. In this way, a friction between the movable sealing member 60 and the fixation seat 50 is reduced. The movable sealing member 60 and the fixation seat 50 cooperatively enclose a sealing compartment 70 located in an inner cavity of the sealing slot 52. In this way, substances in the sealing compartment 70, such as air, oil, and so on, also serve as a barrier against any intruding stains.

Further, the movable sealing assembly 40 further includes an oily sealing material filled in the sealing compartment 70. The oily sealing material forms an oil sealing interface between the movable sealing member 60 and the front wall surface 521 and an oil sealing interface between the movable sealing member 60 and the rear wall surface 522. In the present embodiment, by filling of the sealing compartment 70 with the oily sealing material, the friction is further reduced, and therefore, the wear is further reduced, and furthermore, oil sealing interfaces are formed to improve the sealing effect.

Furthermore, a front end face of the movable sealing member 60 is arranged with a front annular projection 62 at a periphery of the fixation shaft hole 61. The front annular projection 62 is sealed to and rotatably mated with the front wall surface 521. A rear end face of the movable sealing member 60 is arranged with a rear annular projection 63 at a periphery of the fixation shaft hole 61, the rear annular projection 63 is sealed to and rotatably mated with the rear wall surface 522.

In the present embodiment, after the oil sealing interfaces are formed, surfaces of the movable sealing member 60 that contact the inner wall surfaces of the sealing slot 52 are arranged with annular projections, such as the front annular projection 62 and the rear annular projection 63. In this way, the friction is reduced by decreasing a localized contact area, without decreasing the sealing effect, such that the wear is reduced.

Further, in order to reduce the friction, the front wall surface 521 and the rear wall surface 522 of the sealing slot 52 are highly smooth surfaces. A friction coefficient of each smooth surface is less than a friction coefficient of an outer surface of the fixation seat 50. For example, the front wall surface 521 and the rear wall surface 522 of the sealing slot 52 are smoother than the outer surface of the fixation seat 50. Specifically, each of the friction coefficient of the front wall surface 521 and the friction coefficient of the rear wall surface 522 is in a range of [0.05, 0.1].

Further, the movable sealing member 60 is axially pre-compressed to the front wall surface 521 and the rear wall surface 522. In the present embodiment, elastic deformation of the movable sealing member 60 is used to compensate and fill an axial gap generated by vibration, such that it is ensured that a positive pressure required for sealing is greater than a preset threshold value. In some embodiments, an interference between the movable sealing member 60 and the fixation seat 50, in the axial direction, is in a range of [0.1%, 0.5%]. In this way, a preset sealing effect can be achieved, and at the same time, less resistance is applied to rotation of the center shaft 30.

Further, the movable sealing assembly 40 further includes an annular clamp 80. The annular clamp 80 sleeves the outer circumferential surface of the movable sealing member 60. The annular clamp 80 and the movable sealing member 60 fit tightly to each other in a radial direction.

In the present embodiment, the annular clamp 80 enhances the fixation and the sealing effect between the movable sealing member 60 and the center shaft 30. In addition, a radial pressure applied by the annular clamp 80 forces the movable sealing member 60 to be deformed in the axial direction. In this way, it is better ensured that the movable sealing member 60 is axially pre-compressed to the front wall surface 521 and the rear wall surface 522.

Further, the outer circumferential surface of the movable sealing member 60 defines an annular limiting slot 64. The annular clamp 80 is received in the annular limiting slot 64. In this way, the annular clamp 80 cannot be easily detached off from the movable sealing member 60, such that one-piece configuration may be achieved easily, and an assembling efficiency is improved.

Further, the annular clamp 80 is a coiled spring. A front end and a rear end of the annular clamp 80 respectively resiliently abut against two walls of the limit slot 64 that face opposite to each other in the axial direction.

In the present embodiment, the coiled spring is a common member that can be easily obtained and has a low cost. Since the front end and the rear end of the annular clamp 80 respectively resiliently abut against two walls of the limit slot 64 that face opposite to each other in the axial direction, the annular clamp 80 may not be loosened, and sidewalls of the limit slot 64 may protrude outwardly, such that the movable sealing member 60 is enabled to axially pre-compress to the front wall surface 521 and rear wall surface 522.

Further, the fixation seat 50 includes a base 53 and a front cover 57 fixedly connected to the base 53. The base 53 and the front cover 57 cooperatively enclose the sleeving slot 51 and the sealing slot 52. The sleeving slot 51 includes a rear opening 54 defined in the base 53 and a front opening 581 defined in the front cover 57. The front wall surface 521 of the sealing slot 52 is formed on the front cover 57, and the rear wall surface 522 of the sealing slot 52 is formed on the base 53.

In the present embodiment, the fixation seat 50 has a small overall size, and a shape of the sealing slot 52 may not be easily formed by being directly taken out of a mold, i.e., the shape of the sealing slot 52 cannot be formed by being directly taken out of the mold from one direction. Therefore, the base 53 and the front cover 57 are prepared separately and are connected to each other to form the fixation seat 50. In this way, a cost of forming the inner cavity of the fixation seat 50 can be reduced. For example, the base 53 and front cover 57 may be made of metal by being compress-casted and then are threaded or welded to each other. Alternatively, the base 53 and front cover 57 are made of plastics and are ultrasonically welded or glued to each other.

Further, the base 53 includes a sealing cylinder 55. The inner circumferential surface of the sealing slot 52 is formed on the sealing cylinder 55. An inner wall surface of a front end of the sealing cylinder 55 defines an annular slot 551. The front cover 57 includes a cover plate 58 and an inner stopping port 59. The cover plate 58 covers an opening at a front side of the sealing cylinder 55. The inner stopping port 59 is annular and protrudes from a rear side of cover plate 58. The inner stopping port 59 is adapted to be embedded in the annular slot 551. In this way, the base 53 and the front cover 57 may not be misaligned to each other in a transverse direction. In some embodiments, the movable sealing member 60 is made of rubber or silicone. The base 53 and the front cover 57 are both made of plastic. A rear end surface of the inner stopping port 59 is ultrasonically welded to the inner wall surface of the annular slot 551. In this way, even when the movable sealing member 60 is in contact with the base 55 and the front cover 57, the sealing member 60 may not be adhered to the base 55 and the front cover 57, due to the material of the sealing member 60 being different from the material of the base 55 and the front cover 57, during the ultrasonic welding process.

Further, an outer circumferential surface of the inner stopping port 59 is arranged with an outer limiting plane 591. The inner circumferential surface of the annular slot 551 is arranged with an inner limiting plane 552 that is adapted and attached to the outer limiting plane. In this way, the front cover 57 is prevented from rotating with respect to the base 53. Specifically, with respect to the ultrasonic welding process, the limiting structure between the front cover 57 and the base 53 that prevents the relative rotation is helpful in enhancing an efficiency of adhesion.

Further, the base 53 further includes a positioning projection 56 disposed on the front end face of the sealing cylinder 55. An outer edge of the front cover 57 defines a positioning slot 582 that is mated to the positioning projection 56.

In the present embodiment, the positioning projection 56 and the positioning slot 582 are mated to each other to form a multi-level limitation in a circumferential direction. In this way, the limiting mating between the base 53 and the front cover 57 may be more secure. In addition, since the positioning projection 56 and the positioning slot 582 are located at a region that is easily observed, mating between the positioning projection 56 and the positioning slot 582 guides the outer limiting plane 591 to the inner limiting plane 552 to be adapted and attached to each other.

Further, the positioning projection 56 extends axially and protrudes from the outer circumferential surface of the sealing cylinder 55. An inner wall surface of a static sealing member 20 defines an insertion slot 22 which is mated to the positioning projection 56. In this way, limitation of the base 53 in the circumferential direction is achieved. The assembling structure is simplified, and structural strength of the positioning projection 56 is improved. The front end of the positioning projection 56 is located farther outwardly in the radial direction. In this way, an attaching area between the cover plate 58 and the front end surface of the sealing cylinder 55 is increased.

Further, the static sealing member 20 has an annular sealing surface that faces rearwardly. The annular sealing surface is formed at a circumferential surface of a movable shaft hole 21. The front side of the fixation seat 50 seals to and is attached to the annular sealing surface. In this way, sealing performance in the transverse direction is improved. In some embodiments, the fixation seat 50 and the static sealing member 20 are tightly fitted to each other in the axial direction. In this way, any gap generated during vibration may be compensated by elastic deformation.

As shown in FIGS. 1 to 8, the present disclosure further provides a front end waterproof assembly 200 configured for a handheld device. The front end waterproof assembly 200 includes the following.

A housing 10 is arranged defining a cavity 11 therein. A front end face of the housing 10 defines a sealing hole 12 communicated to the cavity 11.

A static sealing member 20 is received in and mated with the sealing hole 12. The static sealing member 20 defines a movable shaft hole 21 communicated with the cavity 11.

The shaft sealing assembly as described in the above is also included.

The center shaft 30 extends through the movable shaft hole 21 and extends out of the housing 10. The center shaft 30 is sealed to and rotatably mated with the movable shaft hole 21.

The movable sealing assembly 40 is received in the cavity and is disposed at a rear side of the static sealing member 20. The fixation seat 50 is fixedly disposed relative to the housing 10.

In the present embodiment, the housing 10 is configured to provide support and protection for any component arranged therein. The housing 10 may be configured for mounting only the sealing assemblies and the transmission assemblies, or may further be configured to be gripped by a user.

The static sealing member 20 and the movable sealing member 60 are typically made of a flexible material, such as rubber, silicone, and so on. In order to improve the sealing effect, an inner wall surface of the movable shaft hole 21 may define a plurality of annular projections that form foldings.

Specific structure of the shaft sealing assembly of the handheld device refers to the above embodiments. Since the electric toothbrush may be configured with all of the technical solutions of the above embodiments, the electric toothbrush may have all of the beneficial effects achieved by the technical solutions of the above embodiments, which will not be repeated herein.

The center shaft 30 is configured to provide connection and transmission. For example, in the embodiment in which the center shaft 30 is applied to the electric toothbrush, the front end of the center shaft 30 is configured to be mounted with the brush head, and the rear end of the center shaft 30 forms a portion of the motor rotor. It is understood that the center shaft 30 is connected to the motor rotor. It is understood that the center shaft 30 and the motor rotor may be configured as two separated components, for example, a transmission mechanism be arranged between the center shaft 30 and the motor rotor.

The fixation seat 50 may be fixedly connected to the housing 10 directly, or may be clamped by the housing 10 and another component, such that the fixation seat 50 is fixedly connected to the housing 10. Since the fixation seat 50 provides supporting and limitation, the fixation seat 50 is usually made of rigid material, such as hard rubber. A specific process of manufacturing the fixation seat 50 may be an injection molding process.

The sealing slot 52 and the movable sealing member 60 are fitted to each other to form a closed space to ensure a sealing effect. The movable sealing member 60 needs to be rotatably arranged with the front wall surface 521 and the rear wall surface 522 of the sealing slot 52. Therefore, in order to reduce the friction, the front wall surface 521 and the rear wall surface 522 of the sealing slot 52 are smooth surfaces, commonly known as highly-smooth surfaces.

For the front end waterproof assembly 200 of the handheld device of the present disclosure, the static sealing member 20 is arranged to form an outer seal, and the movable sealing assembly 40 is arranged to form an inner seal. Specifically, two seals, at the front wall surface 521 and the rear wall surface 522 of the sealing slot 52, are formed by the movable sealing member 60 and the fixation seat 50, respectively. The movable sealing member 60 rotates as the center shaft 30 rotates, and therefore, there is no wear between the movable sealing member 60 and the center shaft 30. In addition, since a movable sealing interface is transferred to the movable sealing member 60, the sealing area is increased, and the sealing effect is improved, such that the waterproof service life of the shaft sealing assembly of the handheld device is extended, and an after-market maintenance rate of the device is reduced.

Figure 9:
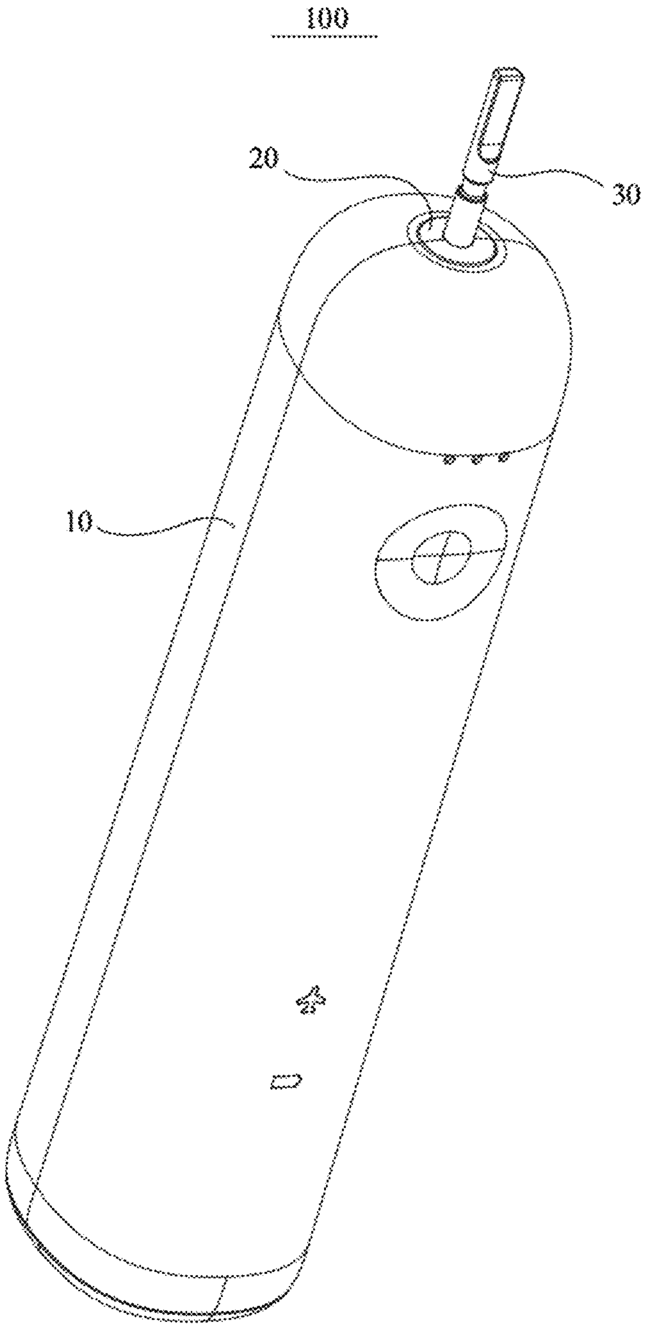
FIG. 9 is a perspective view of a host device of the handheld device according to an embodiment of the present disclosure.

As shown in FIG. 9, the present disclosure further provides a host device 100 of a handheld device. The host device 100 includes a handle and a motor (not shown).

The host device of the handheld device further includes the shaft sealing assembly of the handheld device as described above. The center shaft is a portion of the motor rotor. The fixation seat is fixedly disposed relative to the handle.

Alternatively, the host device of the handheld device further includes the front end waterproofing assembly of the handheld device as described above. The handle may be the housing. The motor is received in the cavity of the housing. The center shaft is a portion of the motor rotor.

In the present embodiment, the host device of the handheld device may be the host device of the electric toothbrush as shown in FIG. 9 or may be a handheld device having other functions, such as an electric curling iron. The handle may provide support and protection for any components arranged inside the handle and can be gripped by the user. The motor is configured to provide a power source for the center shaft 30 to operate. Specific structures of the shaft sealing assembly of the handheld device and the front end waterproof assembly 200 of the handheld device are referred to the above embodiments. Since the electric toothbrush is configured with all technical solutions in the above embodiments, the electric toothbrush has all the beneficial effects achieved by the technical solutions of the above embodiments, which will not be repeated herein.

Finally, to be noted that the above embodiments are only used to illustrate the technical solutions of the present disclosure, do not to limit the present disclosure. Although the present disclosure has been described in detail by referring to the above embodiments, any ordinary skilled person in the art shall understand that the technical solutions in the above embodiments may be modified, or some technical features may be replaced with equivalent ones. The modifications or replacements do not drive the concept of the corresponding technical solutions away from of the spirit and the scope of the technical solutions of the various embodiments of the present disclosure.

What is claimed is:

1. A shaft sealing assembly of an electric toothbrush, comprising:

a center shaft; and a movable sealing assembly, comprising a fixation seat and a movable sealing member;

wherein the fixation seat defines a sleeving hole, an inner circumferential surface of the sleeving hole defines an annular sealing slot, the sealing slot has a front wall surface and a rear wall surface opposite to the front wall surface in an axial direction;

the movable sealing member is made of flexible material, the movable sealing member is received in the sleeving hole and extends into the sealing slot, the movable sealing member defines a fixation shaft hole which is sealed to and fixedly sleeves the center shaft, the movable sealing member is sealed to and rotatably mated to the front wall surface and the rear wall surface;

wherein the fixation seat comprises a base and a front cover fixedly connected to the base, the base and the front cover cooperatively enclose the sleeving hole and the sealing slot, the sleeving hole comprises a rear opening defined in the base and a front opening defined in the front cover, the front wall surface of the sealing slot is formed on the front cover, and the rear wall surface of the sealing slot is formed on the base;

wherein the base comprises a sealing cylinder, an inner periphery of the sealing slot is formed on the sealing cylinder, an inner wall surface of a front end of the sealing cylinder defines an annular slot; the front cover comprises a cover plate and an inner stopping port, the cover plate covers an opening at a front side of the sealing cylinder, the inner stopping port is annular and protrudes from a rear side of the cover plate, the inner stopping port is mated to be embedded in the annular slot;

wherein the base further comprises a positioning projection disposed on a front end face of the sealing cylinder, an outer edge of the front cover defines a positioning slot that is mated to the positioning projection;

wherein the positioning projection extends axially and protrudes from an outer circumferential surface of the sealing cylinder, and an inner wall surface of a static sealing member defines an insertion slot which is mated to the positioning projection.

2. A front end waterproof assembly, comprising:

a housing, defining a cavity, wherein a front end face of the housing defines a sealing hole communicated to the cavity;

a static sealing member, received in and mated with the sealing hole, wherein the static sealing member defines a movable shaft hole communicated with the cavity; and a shaft sealing assembly, comprising:

a center shaft; and a movable sealing assembly, comprising a fixation seat and a movable sealing member;

wherein the fixation seat defines a sleeving hole, an inner circumferential surface of the sleeving hole defines an annular sealing slot, the sealing slot has a front wall surface and a rear wall surface opposite to the front wall surface in an axial direction; the movable sealing member is made of flexible material, the movable sealing member is received in the sleeving hole and extends into the sealing slot, the movable sealing member defines a fixation shaft hole which is sealed to and fixedly sleeves the center shaft, the movable sealing member is sealed to and rotatably mated to the front wall surface and the rear wall surface;

wherein the center shaft extends through the movable shaft hole and extends out of the housing, the center shaft is sealed to and rotatably mated with the movable shaft hole; and the movable sealing assembly is received in the cavity and is disposed at a rear side of the static sealing member, the fixation seat is fixedly disposed relative to the housing;

wherein an outer circumferential surface of the fixation seat is arranged with a positioning projection extending in the axial direction, an inner wall surface of the static sealing member defines an insertion slot mated to the positioning projection.

3. A shaft sealing assembly of an electric toothbrush, comprising:

a center shaft; and a movable sealing assembly, comprising a fixation seat and a movable sealing member;

wherein the fixation seat defines a sleeving hole, an inner circumferential surface of the sleeving hole defines an annular sealing slot, the sealing slot has a front wall surface and a rear wall surface opposite to the front wall surface in an axial direction;

the movable sealing member is made of flexible material, the movable sealing member is received in the sleeving hole and extends into the sealing slot, the movable sealing member defines a fixation shaft hole which is sealed to and fixedly sleeves the center shaft, the movable sealing member is sealed to and rotatably mated to the front wall surface and the rear wall surface;

wherein the fixation seat comprises a base, the base comprises a sealing cylinder and a positioning projection disposed on a front end face of the sealing cylinder, the positioning projection extends axially and protrudes from an outer circumferential surface of the sealing cylinder, and an inner wall surface of a static sealing member defines an insertion slot which is mated to the positioning projection.

* * * * *